United States Patent [19]

Koomey et al.

[11] Patent Number: 4,922,423
[45] Date of Patent: May 1, 1990

[54] POSITION AND SEAL WEAR INDICATOR FOR VALVES AND BLOWOUT PREVENTERS

[76] Inventors: Paul C. Koomey, 5917 Crab Orchard Rd., Houston, Tex. 77057; George M. Savage, 342 Westminster, Houston, Tex. 77024; James T. Stewart, 17923 Fireside Dr., Spring, Tex. 77379

[21] Appl. No.: 130,938

[22] Filed: Dec. 10, 1987

[51] Int. Cl.$^5$ .............................................. G01S 15/88
[52] U.S. Cl. ..................................... 364/422; 367/99; 166/373; 166/250
[58] Field of Search .................. 364/422; 367/99, 107, 367/113, 118; 166/373, 66, 250; 73/119 R

[56] References Cited

U.S. PATENT DOCUMENTS

| | | | |
|---|---|---|---|
| 3,103,976 | 8/1963 | De Vries et al. | 166/336 |
| 4,038,632 | 7/1977 | Parker | 367/82 |
| 4,147,222 | 9/1977 | Patten et al. | 175/9 |
| 4,252,176 | 10/1978 | Page | 367/118 X |
| 4,273,212 | 1/1979 | Dorr et al. | 181/102 |
| 4,337,653 | 7/1982 | Chauffe | 73/151 |
| 4,507,735 | 3/1985 | Moorehead et al. | 364/422 |
| 4,542,652 | 9/1985 | Reuter et al. | 367/99 X |
| 4,543,649 | 9/1985 | Head et al. | 367/99 X |
| 4,636,934 | 1/1987 | Schwendemann et al. | 364/132 |

*Primary Examiner*—Jerry Smith
*Assistant Examiner*—Steven Kibby

[57] ABSTRACT

A position and seal or packing wear indicator for mechanical flow controlling devices such as valves and blowout preventers. For blowout preventers the system includes ultrasonic sensors for each ram and annular blowout preventer of a blowout preventer stack. Each of the ultrasonic sensors is positioned within the wall structure of the valve or blowout preventer and is recessed with respect to the inner wall surface such that a desired echo thereof occurs at the plane of the inner wall surface, thereby rendering the electronic signal processing system capable of accurately and positively sensing the precise positions of the flow controlling devices at all times. Electrical signals from the ultrasonic sensors are converted by an electronic signal conditioner to a usable interface format for transmission through a multi-conductor cable system to a remotely located computer. The computer includes software which generates on its CRT a graphical display of the respective positions of the flow controlling devices. The position detection capability provided by precision spacing of the ultrasonic sensors from the inner wall surface develops sufficient position indicating accuracy that detection of seal or packing wear can be identified. The computer also includes a printer for printing out data such as position indicating data or the graphical display of the CRT and also includes a data port for transmission of data to remote locations via microwave.

7 Claims, 2 Drawing Sheets

POSITION AND SEAL WEAR INDICATOR FOR VALVES AND BLOWOUT PREVENTERS

FIELD OF THE INVENTION

This invention relates generally to valves, blowout preventers and other like mechanisms that are linearly movable between different operating positions such as "open" and "closed" and especially mechanisms that are linearly moved manually, by electrical or mechanical operating systems or by an operating fluid medium of liquid or gaseous nature. More particularly this invention concerns apparatus including various blowout preventers which are typically utilized to control well pressures during drilling activities and thereby prevent well blowout or provide desired well control. More particularly, this invention is directed to annular and hydraulic ram type blowout preventers and concerns apparatus that efficiently determines the absolute mechanical position of the rams, whether fully open, fully closed or in between as well as identifying the positions of the rams with a high degree of accuracy. While the following discussion concentrates for the most part on various aspects of blowout preventers it should be borne in mind that the invention is equally applicable to valves and other apparatus that establish predetermined operative positions especially where a high degree of position indicating accuracy is desirable.

BACKGROUND OF THE INVENTION

The term "seal" as employed herein refers not only to the action of blocking a flow path or path of leakage but also to various sealing devices or structures such as the resilient front ram packers of ram type blowout preventers and the annular sealing packer of an annular blowout preventer. From the front ram packers of ram type blowout preventers and the annular sealing packer of an annular blowout preventer. From the standpoint of valves the term "seal" is also employed in reference to various sealing elements such as seal rings, seat rings and the like.

Blowout preventers (BOP) are currently utilized during almost all oil well applications for the purpose of controlling well pressures in the event of a hydraulic imbalance that occurs when well pressures exceed the hydraulic hydrostatic pressures generated by the drilling fluid at formation level. Typical blowout preventers in use at this time normally consist of a BOP stack including four hydraulic rams and one or two "annular" blowout preventers which are activated by hydraulic fluid pressure from a hydraulic accumulator and pump system and function to close around the drill pipe or close the well bore when there is no pipe in the well. Special rubber devices (front ram packers) are provided on the ends of the rams either to close around the drill pipe (if the drill pipe is in the well bore), or to close off or seal the pipe after it has been sheared such as for an emergency disconnect procedure. The blowout preventer constitutes a valve device which seals the well bore after the drill pipe has been cut. The annular blowout preventers are provided for the purpose of closing around a wider range of pipe sizes or irregular shaped components of the drill string as well as closing on an open hole.

Since the BOPs are absolutely essential in controlling otherwise uncontrollable well bore pressures and are the final link in preventing catastrophic results in the event of a potential blowout, and because of other potentially dangerous and expensive possibilities, it is highly desirable to know the exact position of each ram of the blowout preventer at any point in time. Also, the relative position of the annular preventer closing mechanism is of importance in gauging seal wear and thus properly scheduling repair activities so as to save considerable repair costs including expensive service vessel costs for subsea repair activities.

Systems which have been experimented with in the past involve measuring the amount of hydraulic fluid pumped into the hydraulic cylinder and piston assembly to determine the ram position. However, such systems were subject to the inherent problem associated with hydraulic leaks and fluid compressibility. (The blowout preventer may be located at the bottom of the sea bed in as much as 12,000 feet of water). In this hostile environment it is appropriate to provide a system for absolutely establishing accurate determination of the positions of the various rams of the BOP so that well controlling activities may be efficiently accomplished. Further, the rams of BOPs must be cycled periodically to insure that they will be functional in the event of an emergency. During such cycling, seal wear will occur. It is also desirable therefore to provide an efficient means for accomplishing accurate determination of seal wear in order that the BOP may be restored to proper operating condition in the event wear of the ram seals has occurred.

SUMMARY OF THE INVENTION

It is a principal feature of the present invention to provide a novel blowout preventer ram position and wear indicator for seals such as the front ram packers of ram type blowout preventers that utilizes ultrasonic sensing for sensing the position of each of the hydraulic pistons to thereby provide accurate indication of the relative positions of the various rams of a BOP.

It is another feature of this invention to provide a novel position indicator in the form of an ultrasonic sensor having sufficient accuracy that wear of front ram packers or the annular packers of blowout preventers may be efficiently detected.

It is an even further feature of this invention to provide a novel position indicator system for BOPs which is not sensitive to typical positions of BOP installation such as on land, in shallow water and in extremely deep sea water.

Briefly, the BOP position indicator of this invention solves the problem of knowing the position of the hydraulic ram or annular closing cylinder absolutely, based on its actual mechanical position rather than by an assumed position based on secondary measurement activities such as, for example, measuring the amount of hydraulic fluid pumped into a cylinder and utilizing that measurement to calculate movement of a hydraulic ram. In the case of valves the actual position of the valve element can be directly or indirectly ascertained by ultrasonic sensing. For example for rotary valves with linear activities the sensor may be mounted on the valve or on other structure to detect the position of the linear actuator. The present invention incorporates a direct position measuring device in the form of an ultrasonic sensor which is capable of determining in ram type blowout preventers the mechanical position of the hydraulic piston (and thus the ram) to within 0.01 inches or better. The ultrasonic sensor for each of the rams of the BOP will be mounted in, on or adjacent to the housing of the ram with the position of the mounting varying with the type and character of BOP that is constructed by the various manufacturers thereof. Typically, the ultrasonic sensor will be mounted in, on or adjacent to the end cap of the cylinders of ram type BOP which have automatic locking mechanisms and will sense either the hydraulic piston which is mechanically affixed to the ram or the rod or other mechanical part which attaches mechanically to the ram. Sensors for annular type BOPs will be mounted in, on or adjacent to the BOP body in such manner as to similarly measure piston travel. Sensors for valves can be mounted in the valve housing in reasonably close proximity to the valve element, alternatively the sensors may be mounted externally of the valve or on other structure to detect the position of a movable valve element such as, for example, a suitable component of the linear actuator of a rotary valve. Obviously the particular location of sensor positioning will vary from manufacturer to manufacturer of BOP valves and other such devices. When ultrasonic waves propagate through solid materials such as steel and liquid materials such as hydraulic oil, grease, water BOP fluid, etc. the velocity of the ultrasonic waves change drastically. This can develop a sort of dead spot at the inner surface of a wall being penetrated by ultrasonic waves. A dead spot or band of this nature adversely affects the capability of indicating the position of movable objects spaced from the wall. If a detectable echo, for example, the first echo, of an ultrasonic sensor occurs at the plane of the inner surface of the wall then accurate position measurement in relation with the wall can be accomplished. To solve the inherent problem with ultrasonics, of measuring through two different mediums (in this case steel and hydraulic fluid or grease) and the inherent inaccuracies at or near the steel in which the sensor is mounted, the steel end cap on each ram will be drilled and tapped and a precision machined steel plug inserted between the sensor and the hydraulic fluid or grease in such a way that the forward end of the plug is retracted in precision spaced relation with the inner surface of the end cap so that the desired accuracy of ram position indication can be maintained even with the ram in its fully retracted position.

The blowout preventer rams and the annular position indicator system utilize ultrasonic position sensors to solve the problem of accurately determining the actual position of each ram or annular BOP sealing element on a blowout preventer stack with an accuracy of about 0.010 inches, (at any position of the ram from fully extended (closed) to fully retracted (open).

The ultrasonic position indicator system will not only accurately allow operators to determine if a particular ram is open or closed but will also indicate its position within an accuracy in the range of 0.010 inches or better. This will allow the operator to also determine (with the BOP closed) wear on the front ram packer element (front ram packers in the case of RAM type BOPs or the annular element in case of annular BOPs) which greatly enhances safety (with the assurance that the packer remains in good working order) and may prevent expensive retrieval of the BOP stack to check the ram and annular packer which may still be good. In addition, should a problem occur with any of the packer elements, the problem will be readily apparent while the BOP stack is still in place during the legally mandatory BOP tests.

The position indicating system is composed of ultrasonic sensors, electronic signal processors housed in a waterproof housing, and a suitable computer such as an IBM compatible computer with CRT and printer and copyrighted software, appropriate for generation of graphics for the CRT and printer. The position indicator system is capable of transmitting the graphics and reports to remote computers by a microwave transmission system

BRIEF DESCRIPTION OF THE DRAWINGS

So that the manner in which the above recited features, advantages and objects of this invention as well as others which will become apparent are attained and can be understood in detail, a more particular description of the invention, briefly summarized above, may be had by reference to the embodiments thereof that are illustrated in the appended drawings, which drawings form a part of this specification.

It is to be noted, however, that the appended drawings illustrate only typical embodiments of this invention and are therefore not to be considered limiting of its scope, for the invention may admit to other equally effective embodiments.

DETAILED DESCRIPTION OF PREFERRED EMBODIMENT

As explained above, the discussion relating to the preferred embodiment is for the purpose of simplicity and to promote ease of understanding, limited for the most part to application of the invention in conjunction with BOPs. The invention has application to valves of all types and to other mechanical devices.

Figure 1:
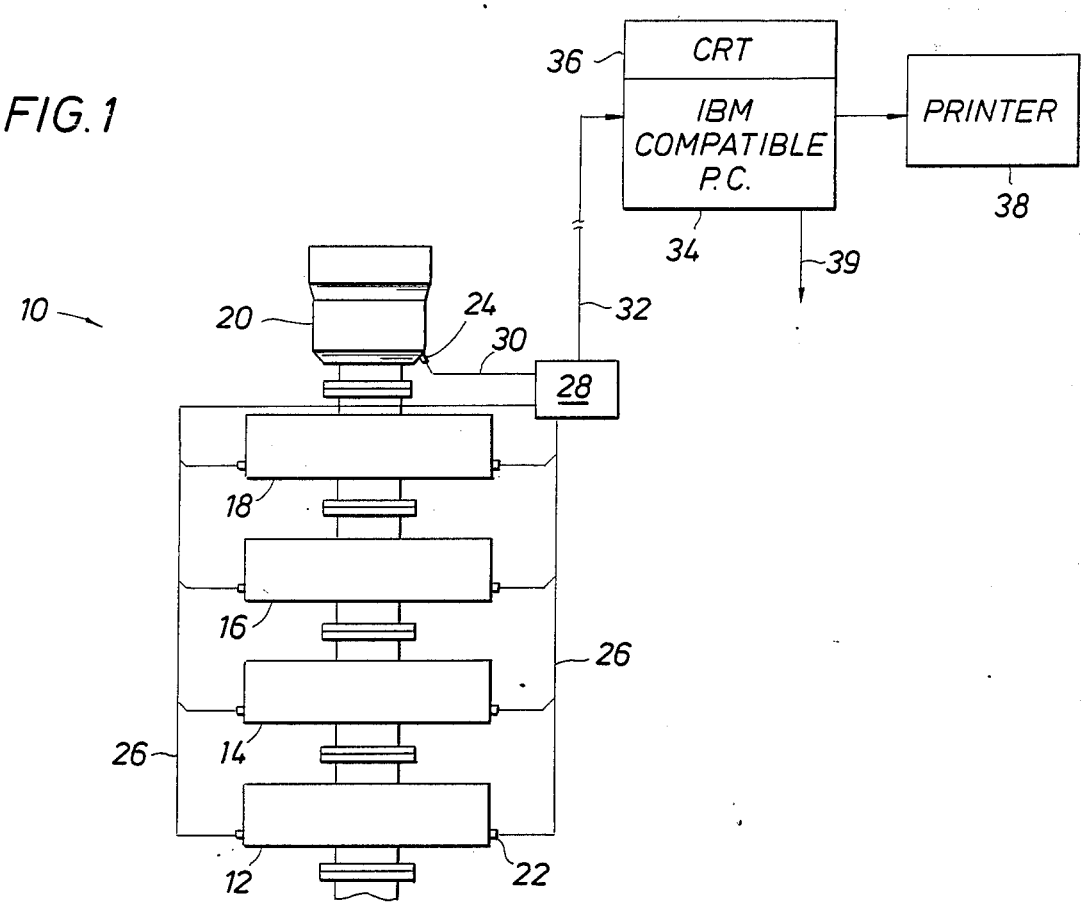
FIG. 1 an elevational representation of a BOP stack equipped with ultrasonic sensors and illustrating in schematic form an electronic module, a computer, CRT and printer assembly for processing position indicating signals from the sensors.
Figure 3:
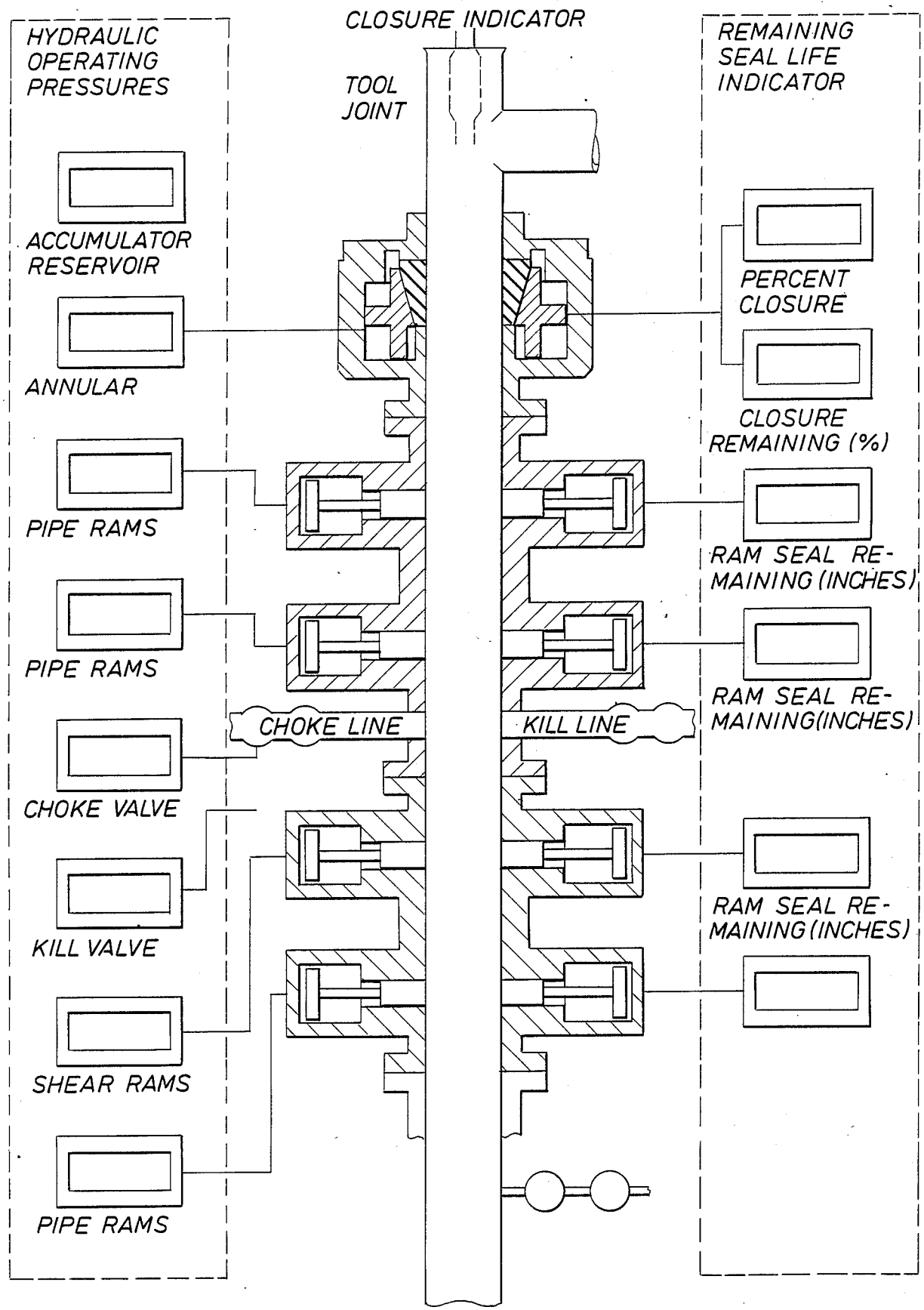
FIG. 3 is a sectional view in elevation which is representative of a CRT display presenting a particular blowout preventer stack and providing various technical information such as ram and annular BOP positions, operating pressures, remaining seal life, etc.

Referring now to the drawings and first to FIG. 1, a BOP stack is illustrated generally at 10 which is a component part of a blowout prevention system designed particularly for oil and gas exploration. The BOP stack 10 incorporates a plurality of hydraulic rams typically including four sets of hydraulically energized rams. It should be borne in mind that this invention is not limited to any particular type of BOP or valve. The invention is equally applicable to most BOPs and valves including those of the manually operated type and those operated electrically pneumatically mechanically and hydraulically. Typically, the BOP stack includes lower pipe rams 12 for sealing on the pipe and pipe shear rams 14 located immediately thereabove. Above the shear rams are provided pipe engaging rams 16 and 18 having resilient pipe engaging packing elements located at the inner ends thereof. The BOP stack is typically completed by one or more annular blowout preventers 20. For subsea application two annular BOP's are typically employed. As shown in FIG. 1, each of the rams 12-18 are provided with ultrasonic position indicating sensors 22, there being one position indicator sensor for each hydraulically energized ram. A like position indicator sensor 24 is provided for each annular BOP to also indicate the position of its internal piston to thus identify the position of the annular packer. The various position indicating sensors are each coupled with appropriate conductors 26 which are in turn coupled with the circuitry of an electronic module 28. The sensor of the annular BOP 20 is also coupled by a conductor 30 to the electronic module 28. A multiconductor cable 32 is coupled with the electronic module and extends from the site of the BOP stack to the location of a suitable computer 34 which, in this case, may be an IBM compatible clone computer. To provide indication of wear of the resilient packers or seals of a ram type BOP the computer software has the capability of totalizing linear movement of opposed rams and interpolating such linear movement in comparison with parameters of allowable ram travel in order to determine ram standoff and thus determine wear of the ram packer elements of each ram. The computer 34 has coupled with it a cathode ray tube (CRT) 36 which provides a graphical display of the nature set forth in FIG. 3. The computer also incorporates a printer 38 for providing hard copy printouts of the computer display of FIG. 3, or, in the alternative, printing out appropriate data identifying the positions of the various ram and the annular BOPs together with data reflecting the wear characteristics of the elastic pipe engaging packers of the various pipe rams. Additionally, the computer defines a telemetry port 39 which may be coupled with a microwave transmission system, telephone data transmission system or the like for transmission of computer generated position indicating and wear indicating data to remote locations.

Figure 2:
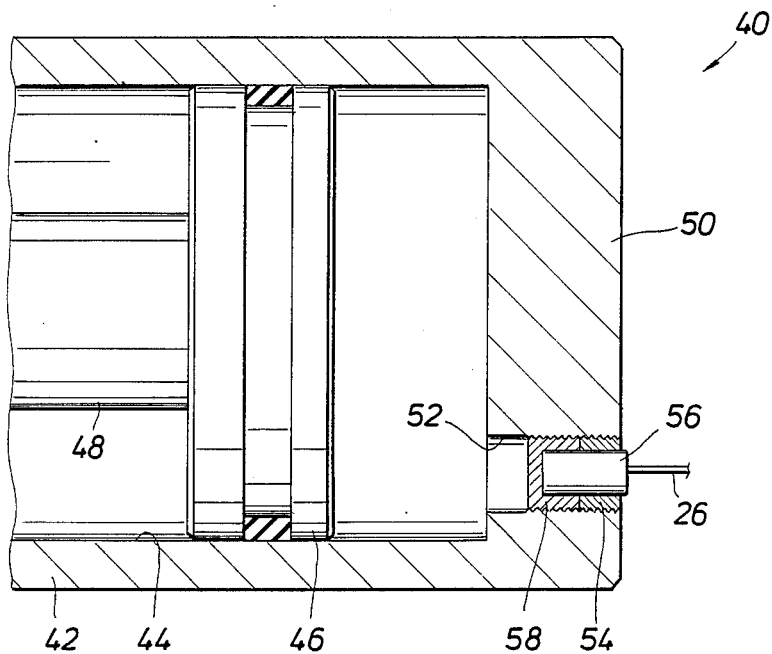
FIG. 2 is a fragmentary sectional view of one of the rams of the BOP stack of FIG. 1 illustrating an ultrasonic sensor positioned in recessed relation within the end wall or cap of the piston housing.

Referring now to FIG. 2, each of the pipe rams 12, 16 and 18 and the shear ram 14 may incorporate a hydraulic ram activating structure of the nature shown generally at 40. The housing structure 42 generally forms a hydraulic cylinder having an inner cylindrical wall 44 which is disposed in sealing engagement with a piston 46 forming the free end portion of an operating rod 48. The opposite end of the rod 48 is connected with a pipe gripping ram or a pipe shearing ram as the case may be. The housing structure 42 forms an end wall 50 which forms a pressure resisting or centering wall portion of the BOP housing. The wall 50 is machined such as by drilling and threading to form a port 52. A precision machined plug 54 is threadedly secured within the port 52 to form a sealed closure of sufficient structural integrity to withstand the hydrostatic pressure of sea water at a depth of 12,000 feet or so. The precision machined plug also provides support for an ultrasonic sensor 56 having conductor 26 interconnected therewith. The ultrasonic sensor 56 is supported by the precision machined plug 54 within the port 52 to allow accurate ultrasonic sensing of the position of the hydraulic piston in its fully retracted position. It is well known that ultrasonic waves propagating through dissimilar materials will travel at differing velocities dependent upon the density of the materials. It is also well known that ultrasonic waves propagate at greater velocity through more dense materials such as metal as compared with less dense materials such as water, oil, grease, well drilling fluid, etc. When ultrasonic waves are propagated through dissimilar materials echoes or wave reflections occur at the interface therebetween. When ultrasonic waves are propagated through such dissimilar materials and to another object and are employed to detect the position of that object relative to the sensor, the wave reflections resulting from the materials and material interfaces located between the sensor and the object to be sensed develop signal return interference that prevents accurate detection of the position of the object if it is located within a specified distance from the sensor. This signal return interference constitutes a dead band within which reflected signals are difficult to detect and which extends forwardly of the more dense material by a distance that is a function of the density and thickness of the more dense material. Thus for accurate sensing of the position of the object in relation to the sensor it is essential that the object remain free of the signal return interference dead band. According to the present invention the ultrasonic sensor and the pressure containing plug that separates the sensor from the hydraulic medium of the blowout preventer are recessed from the inner surface of the end cap wall of the blowout preventer such that the interference dead band is located rearwardly of the inner surface and does not interfere with ram position measurements even when the ram piston is very close to or in engaging relation with the inner surface of the end cap or other wall of the blowout preventer. The retracted position of the ultrasonic sensor permits efficient measuring through two different mediums (steel and hydraulic fluid or grease). The retracted positioning of the ultrasonic sensor also eliminates the inherent inaccuracies of sensors of this type when disposed in close proximity with the steel in which the sensor is mounted. The steel end cap or wall structure 50 of each hydraulically energized ram will be drilled and tapped and a precision machined steel plug 58 will be inserted between the sensor and the hydraulic fluid (or grease) in such manner that the inner surface of the plug is retracted from the inner surface of the end cap or wall structure sufficiently to maintain the desired accuracy of the sensor even with the hydraulic piston and ram in its fully retracted position with the piston 46 in close proximity to the inner surface of the end wall 50. When ultrasonic waves traverse two differing materials, for example a solid such as steel or another metal and a liquid such as oil, grease, water, drilling fluid, etc. the velocity of the waves change significantly. For example the velocity of ultrasonic wave propagation through steel is almost exactly four times the velocity of ultrasonic wave propagation through water. For this reason in propagation of ultrasonic waves through the steel end caps of the cylinders of a ram type BOP and through the oil, grease or drilling fluid within the cylinders it is difficult to obtain accurate measurement of the fully extended positions of the pistons of the rams. Ultrasonic signals propagated through these dissimilar mediums would constitute an interfering signal dead band projecting from the inner surface of the end cap to a location approximately four times the thickness of the steel wall of the end cap. In this condition the ends of the pistons will be in closely spaced relation with the inner surfaces of the end caps thus perhaps locating the ends of the pistons in a sort of dead area from the standpoint of accurate detection, which dead band is defined by these interfering signals. To overcome this adverse situation the precision machined plug is positioned with its inner end surface retracted from the inner end surface of the end cap by a distance sufficient that the signal dead band will be located rearwardly of the inner surface. The precision positioning of the plug will ensure that the piston will never be present within the signal dead band and its ultrasonic signal reflections will be readily and accurately detected regardless of its position. This feature permits precision detection of the extreme outboard position of the ram even under circumstances where the outboard piston position is quite near or in actual contact with the inner surface of the end cap. This feature also enables detection of ram positioning to the extent of accuracy that is appropriate for detection of packer wear at the extreme inboard positions of the rams.

The electronic module 28 is an ultrasonic electronic module including a transmitter and receiver for exciting the ultrasonic sensor and processing the signals returned from the ultrasonic sensor to develop useful electronic signals, typically in the range of 4-20 MA. (milliamperes) which are proportional to the position of the particular ram under consideration. The electronic module 20 will include multiplexing circuitry to thus enable electronic processing of all of the signals from the respective sensors of the BOP rams and the annular BOP. The electronic module will also employ an electronic signal conditioner to convert the 4-20 MA. BOP ram positioning signals and the various hydraulic pressure signals to a useful interface format for transmission through the multi-conductor cable 32 to a remotely located computer. The multi-conductor cable 32 may be in the order of 12,000 feet in length in such cases where the BOP stack is located at or near the ocean floor in extremely deep water conditions.

The various position indicator sensors 22 and the electronic module 28 will each be provided with waterproof housings thereby enabling them to effectively withstand continuous submergence such as when positioned in extremely deep sea water. These waterproof housings are also effectively adapted to withstand or compensate for severe hydrostatic pressure changes such as would occur upon installation of a subsea BOP stack for deep water drilling activities in the order of 12,000 feet or so.

The computer system 34 can take any suitable form, but will typically be in the form of an IBM or IBM compatible clone personal computer with either a monochrome or color CRT for display of graphics showing in graphic form the movement and position of the hydraulic rams and a readout of actual hydraulic ram positions and hydraulic pressures. As mentioned above, FIG. 3 is representative of the graphical display of the CRT 36 as provided by appropriate software in response to the various processed signals received by the computer 34. The computer system employs an appropriate software package to scan the pressure signals and ultrasonic position indicator signals that are conducted from the output of the electronic module 28 by the multi-conductor cable 32 and to convert the data to the graphic display referenced in FIG. 3.

The printer 38 is employed to print out the time and the position and pressure information in a report form with the ability to print on a regular time basis and on an operator interrogation basis. The graphic display of the CRT 36 can also be printed out if desired.

The serial port interface 39 of the computer system 34 is provided to allow the data and the graphics generated by the computer to be transmitted via a microwave transmission system to remote points where the information may be received and utilized as desired.

The blowout preventer ram or annular position indicator will have a number of advantages which have been unavailable to interested parties heretofore. The ultrasonic position indicating and seal wear indication system provides accurate real-time position indicating information based on the actual mechanical position of the various pistons of the pipe and shear rams and the annular BOP of the BOP stack. A graphics display is provided which is based on the actual mechanical position of the rams and the annular BOP. Further, the blowout preventer ram and annular position indicating system hereof effectively provides the ability to transmit real-time position indicating information and information indicating piston wear to remote locations where it may be effectively utilized for proof of compliance with governmental regulations, maintenance planning activities and for general record keeping. The computer system incorporates specific software to present a graphic representation of the BOP stack to the operator in a computer format which allows the operator to interface with remote IBM compatible computers, thereby allowing real-time dissemination of critical blowout parameters to remote locations.

The present invention therefore provides the operator with the capability of determining the absolute mechanical position of the BOP rams whether fully opened, fully closed and in between the open and closed positions with a high degree of accuracy previously unattainable, including the position of the annular BOP. Due to the accuracy of the ram position indicating system the user can effectively determine the wear of the front ram packer on ram preventers and when they need replacing due to wear, while the preventer is in operation. Wear on the annular blowout preventer seal element can also be measured while in operation. By knowing the absolute mechanical position of the opposing rams, the computer software can efficiently determine the front ram packer wear on each pair of rams of the BOP stack. The position and wear on the annular element of an annular BOP can be effectively determined by measuring the upward (linear) stroke of the piston which imparts closing movement to the annular packer element.

The present invention provides a real-time graphic display of the absolute mechanical position of the rams and the annular element of the BOP. This invention also provides an IBM compatible data link to print out position reports and BOP test data via telephone line or microwave from offshore well sites for the operators (oil companies) and drilling contractors, or other interested parties. The invention also provides absolute ram mechanical position, both for the ram and annular preventers, with an accuracy of 0.01 inches or better by employing ultrasonic sensors to measure from a fixed end to the actuator or to the ram element itself. The recessed ultrasonic sensor and electronic signal processing system provides for accurate detection of the fully opened position of the BOP rams including the resolving of the problem of detecting the position through two different mediums (steel and grease/hydraulic closing fluid) utilizing electronic sensors.

In view of the foregoing it is respectfully submitted that the ultrasonic position indicator system of this invention is capable of accomplishing all of the features hereinabove set forth together with other features which are inherent from a description of the apparatus itself. It will be understood that certain combinations and subcombinations are of utility and may be employed without reference to other features and subcombinations. The scope of this invention is intended to be limited only by the scope of the appended claims and is not limited by the specific embodiments shown and described herein.

What is claimed is:

1. An ultrasonic position indicator and wear indicator system for blowout preventer stacks having linearly movable blowout preventer elements therein which are movable by a fluid substance contained therein and wherein each blowout preventer stack forms housing means having wall means forming an inner surface oppositely located with respect to internal linearly movable blowout preventer elements thereof, said wall means forming a port extending therethrough, comprising:

(a) a precision plug forming a fluid interface surface at the forward end thereof and being disposed in sealed relationship within said port, said plug being composed of a material permitting higher velocity propagation of ultrasonic waves therethrough as compared with said fluid substance such that ultrasonic wave reflection through said plug develops a reflection signal interference band projecting a predetermined distance forwardly of said fluid interface surface, said plug being recessed within said port such that said fluid interface surface is positioned greater than said predetermined distance rearwardly of said inner surface of said wall and said reflection signal interference band is thus located rearwardly of said inner surface of said wall; and (b) ultrasonic sensor means being spaced from said inner surface of said wall means and being positioned to transmit ultrasonic waves forwardly through said plug and to receive ultrasonic waves reflected from a respective one of said blowout preventer elements and propagated rearwardly through said plug, upon excitation by said reflected ultrasonic waves said ultrasonic sensor means developing electrical signals accurately reflecting the distance of said internal linearly movable blowout preventer elements from said ultrasonic sensor means and thus accurately reflecting the position of said internal linearly movable blowout preventer elements within said housing means.

2. The position indicator and wear indicator system as recited in claim 1, wherein (a) said port forms an internally threaded section; and (b) said precision plug is formed of steel and defines external threads forming a threaded connection with said internally threaded section, said fluid interface surface of said plug establishing a metal/liquid interface with said fluid substance contained within said housing means.

3. The position indicator and wear indicator system as recited in claim 1 wherein:

(a) said linearly movable blowout preventer elements are pipe engaging rams having annular pipe retaining and bore closing elements and hydraulic pistons having piston connectors for imparting opening and closing forces to said pipe engaging rams and annular pipe retaining and bore closing elements; and (b) said ultrasonic sensor means being supported by said plug and being selectively positionable in predetermined spaced relationship rearwardly of said inner surface of said walls of said housing means and opposite at least one of said hydraulic pistons for detecting the position of selected ones of said pipe engaging rams and said hydraulic piston relative to said housing means.

4. The position indicator and wear indicator system as recited in claim 3, wherein:

(a) at least some of said pipe engaging rams include resilient end members for engaging drill pipe; and (b) said ultrasonic sensor means detecting positions of said blowout preventer elements with sufficient accuracy of position indication that wear of said resilient end members is readily detected.

5. A position indicator and wear indicator system as recited in claim 1, wherein said blowout preventer stack includes annular blowout preventer means, and:

(a) said annular blowout preventer means incorporating an annular resilient sealing member;

(b) said linearly movable blowout preventer element comprises hydraulically energized piston means being linearly movable responsive to predetermined hydraulic pressure to impart a closing force to said annular resilient sealing member; and (c) said ultrasonic sensor senses the position of said hydraulically energized piston means, which position is indicative of wear or damage of said annular resilient sealing member.

6. The piston indicator and wear indicator system as recited in claim 1, wherein:

(a) said wall means comprises an end cap of a piston cylinder and said linearly movable blowout preventer element comprises a piston movably housed in said cylinder;

(b) said ultrasonic sensor being located within said end cap and thus being positioned in opposed relation with said piston.

7. A position indicator and wear indicator for blowout preventers and the like having linearly movable piston elements therein which are moved by the pressure of a liquid medium comprising:

(a) housing means establishing a fixed structure having a wall forming a port positioned in opposed relation with one of said linearly movable piston elements of said blowout preventer, said housing means containing said liquid medium;

(b) a precision plug forming a fluid interface surface at the forward end thereof and being disposed in sealed relationship within said port, said plug being composed of a material permitting higher velocity propagation of ultrasonic waves therethrough as compared with said fluid substance such that ultrasonic wave reflection through said plug develops a reflection signal interference band projecting a predetermined distance forwardly of said fluid interface surface, said plug being recessed within said port such that said fluid interface surface is positioned greater than said predetermined distance rearwardly of said inner surface of said wall and said reflection signal interference band is thus located rearwardly of said inner surface of said wall; and (c) an ultrasonic sensor means being supported by said precision plug and positioned to transmit ultrasonic signals through said plug and through said liquid medium to said one of said piston elements and to receive reflected ultrasonic signals being propagated from said one of said piston elements through said liquid medium and said plug for precision location of said one of said piston elements in relation to said sensor, upon being excited by said reflected ultrasonic signals said ultrasonic sensor means developing electrical signals accurately reflecting the distance of said linearly movable piston element from said ultrasonic sensor means and thus accurately reflecting the position of said piston element relative to said housing means.

* * * * *